United States Patent [19]
Queveau et al.

[11] Patent Number: 6,145,915
[45] Date of Patent: Nov. 14, 2000

[54] TRUNK FOR CONVERTIBLE VEHICLE WITH FOLDING ROOF, COMPRISING A TRUNK LID AND A REAR SHELF

[75] Inventors: Gérard Queveau; Paul Queveau; Jean-Marc Guillez, all of Cerizay, France

[73] Assignee: France Design, Cerizay, France

[21] Appl. No.: 09/288,680

[22] Filed: Apr. 9, 1999

[30] Foreign Application Priority Data

Apr. 9, 1998 [FR] France ................................. 98 04475

[51] Int. Cl.[7] ............................................. B60J 7/00
[52] U.S. Cl. ..................... 296/107.08; 296/136; 296/76
[58] Field of Search ............... 296/107.08, 136, 296/76

[56] References Cited

U.S. PATENT DOCUMENTS

| | | |
|---|---|---|
| 3,338,624 | 8/1967 | Champion . |
| 5,551,743 | 9/1996 | Klein et al. ............................ 296/76 |
| 5,823,606 | 10/1998 | Schenck et al. .................... 296/107.08 |
| 5,864,214 | 1/1999 | Brodsky ................................. 318/282 |
| 6,030,023 | 2/2000 | Guillez .................................. 296/136 |

FOREIGN PATENT DOCUMENTS

| | | |
|---|---|---|
| 37 43 502 | 7/1989 | Germany . |
| 44 45 941 | 3/1996 | Germany . |

*Primary Examiner*—Dennis H. Pedder
*Assistant Examiner*—Mickki D. Murray
*Attorney, Agent, or Firm*—Kenyon & Kenyon

[57] ABSTRACT

A trunk for a convertible vehicle with a folding roof comprises a trunk lid which can open on the one hand for stowing the folded roof and on the other hand for stowing luggage. A rear shelf extends under the rear part of the roof in the closed position on the vehicle and folds to allow the folded roof to pass.

The rear shelf is articulated to the front edge of the trunk lid and is mobile between a position in which it extends between the front edge of the trunk lid and a wall that closes the front of the trunk and a folded position in which it extends under the trunk lid.

7 Claims, 3 Drawing Sheets

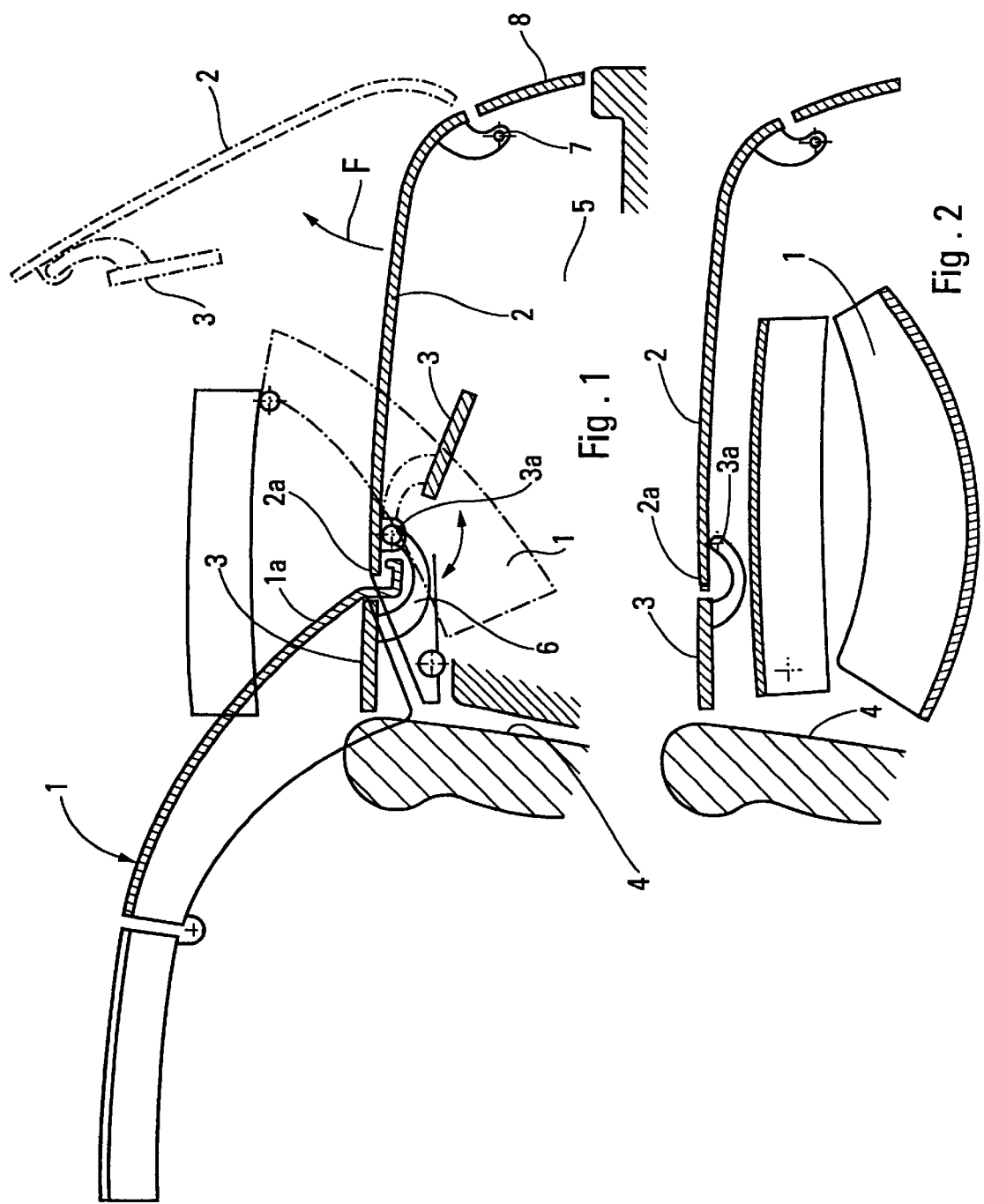

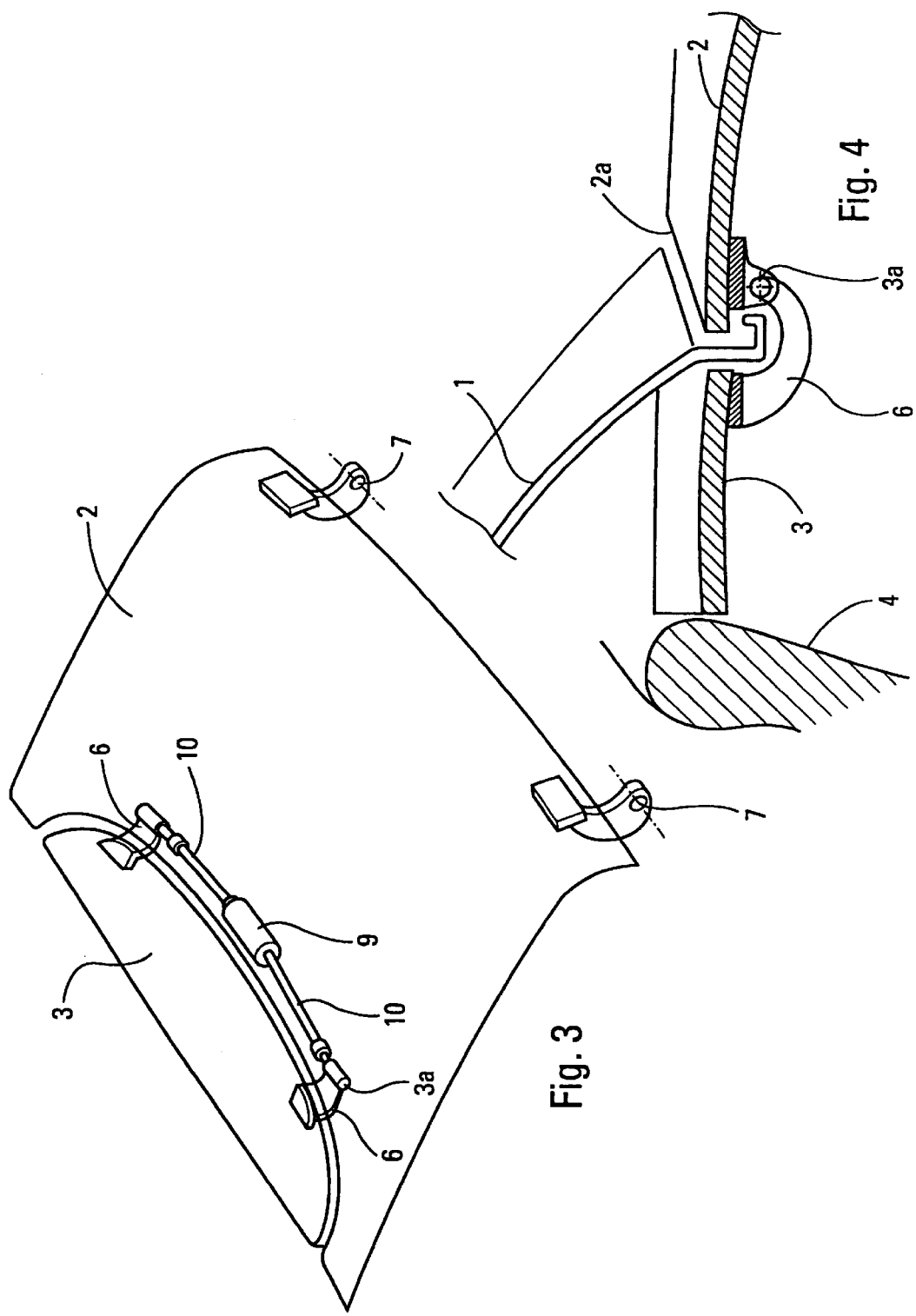

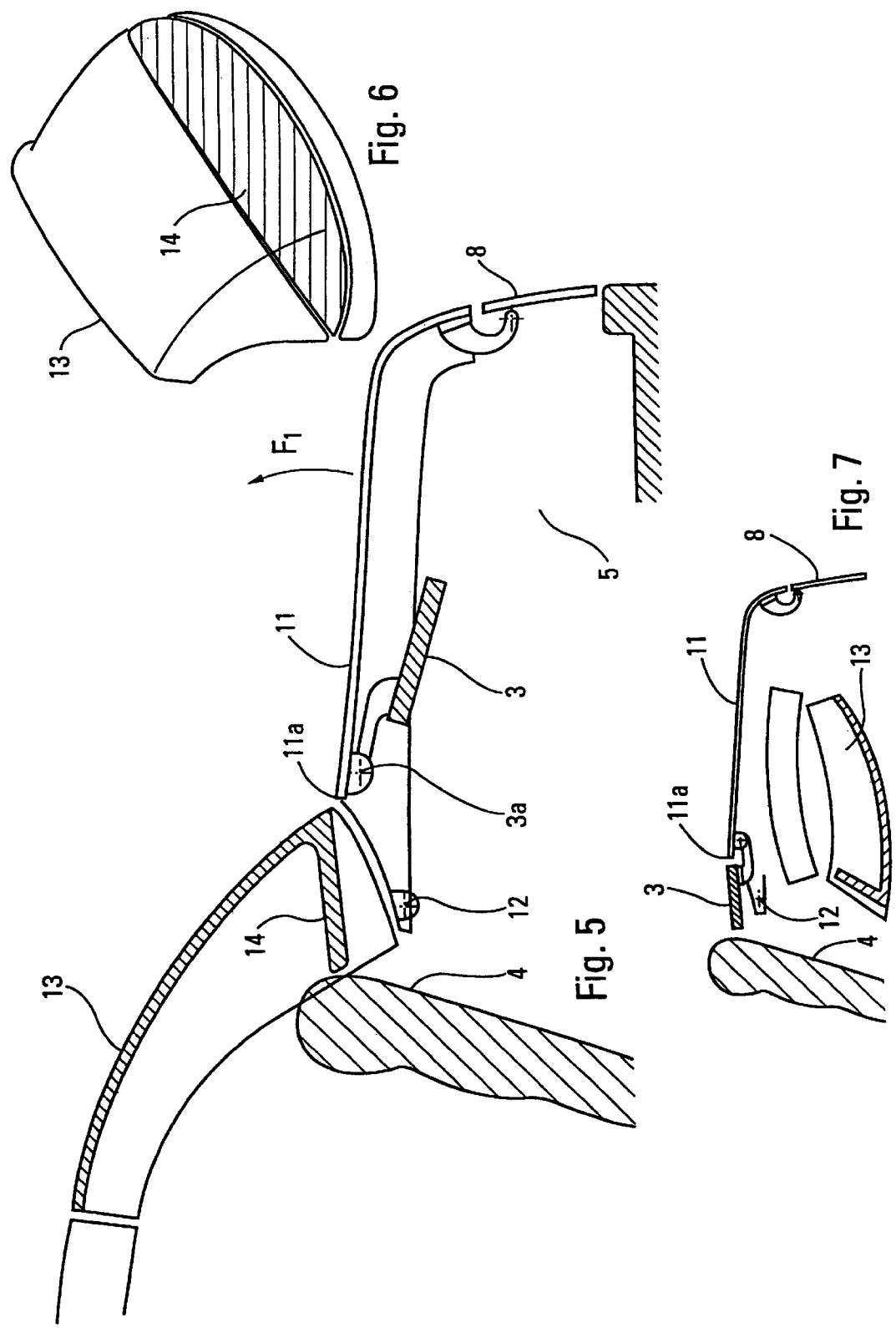

TRUNK FOR CONVERTIBLE VEHICLE WITH FOLDING ROOF, COMPRISING A TRUNK LID AND A REAR SHELF

BACKGROUND OF THE INVENTION

1. Field of the Invention

The present invention concerns a trunk for convertible vehicles having a folding roof, comprising a trunk lid adapted to open on the one hand for stowing the folded roof and on the other hand for stowing luggage and a rear shelf extending under the rear part of the roof when in the closed position on the vehicle and able to fold to allow the folded roof to pass.

2. Description of the Prior Art

French patent 2 728 199 discloses a device of the above kind in which the rear shelf pivots forward and downward when the roof moves toward the trunk after the trunk lid is opened from the front toward the rear.

A device of the above kind necessitates many complicated components articulated to each other.

The aim of the present invention is to remedy this drawback.

SUMMARY OF THE INVENTION

The invention consists of a trunk for a convertible vehicle with a folding roof comprising a trunk lid which can open on the one hand for stowing the folded roof and on the other hand for stowing luggage and a rear shelf extending under the rear part of the roof in the closed position on the vehicle, adapted to fold to allow the folded roof to pass, articulated to the front edge of the trunk lid and mobile between a position in which it extends between the front edge of the trunk lid and a wall that closes the front of the trunk and a folded position in which it extends under the trunk lid.

Because the rear shelf is attached to the trunk lid, the shelf, when folded toward the lid, follows opening and closing of the lid whilst completely freeing access to the trunk for luggage or the folded roof.

In an advantageous version of the invention the rear shelf is articulated to the front edge of the trunk lid by at least one swan-neck member.

In a first version of the invention the trunk lid is articulated to the rear part of the trunk so that it can open from the front toward the rear.

In a second version of the invention the trunk lid is articulated to the front of the trunk so that it can open from the rear toward the front.

In this version the rear part of the folding roof includes a wall that closes the space between the front edge of the trunk lid and the wall that closes the front of the trunk.

Other features and advantages of the invention will become more apparent in the following description.

BRIEF DESCRIPTION OF THE DRAWINGS

In the accompanying drawings, which are given by way of non-limiting example:

FIG. 1 is a view partly in longitudinal section of a convertible vehicle having a trunk in accordance with the invention;

FIG. 2 is a view of the trunk partly in longitudinal section with the roof stowed in the trunk;

FIG. 3 is a perspective view showing the members for pivoting the rear shelf;

FIG. 4 is a partial view to a larger scale of a detail of the articulation of the rear shelf to the trunk lid;

FIG. 5 is a view analogous to FIG. 1 showing another version of the invention;

FIG. 6 is a perspective view showing the rear part of the folding roof of the FIG. 5 version; and FIG. 7 is a view partly in longitudinal section of the trunk in the FIG. 5 version with the roof stowed in the trunk.

DETAILED DESCRIPTION OF THE PREFERRED EMBODIMENTS

Referring to FIG. 1, the trunk for a convertible vehicle with a folding roof 1 comprises a trunk lid 2 that can open on the one hand for stowing the folded roof 1 and on the other hand for stowing luggage.

The trunk further comprises a rear shelf 3 extending under the rear part 1a of the roof 1 when it is in the closed position on the vehicle. The rear shelf 3 can fold to enable the folded roof 1 to pass.

In accordance with the invention, the rear shelf 3 is articulated at 3a to the front edge 2a of the trunk lid 2 and can move between a position in which it extends between the front edge 2a of the trunk lid 2 and a wall 4 that closes the front of the trunk 5 and a folded position in which it extends under the trunk lid 2.

In the example shown, the rear shelf 3 is articulated to the front edge 2a of the trunk lid 2 by at least one swan-neck member 6.

In the version shown in FIGS. 1 and 2 the trunk lid 2 is articulated at 7 to the rear part 8 of the trunk so that it can open from the front toward the rear, as shown by the arrow F.

In the above version, means are provided for successively:

pivoting the rear shelf 3 to fold it under the trunk lid 2, opening the trunk lid 2 by rotating it from the front toward the rear, folding the roof 2 and stowing the folded roof in the trunk 5, and folding the rear shelf 3 toward the front (see FIG. 2) to close the space between the front edge 2a of the trunk lid 2 and the wall 4 that closes the front of the trunk 5.

FIG. 3 shows how the rear shelf 3 is pivoted by an electric motor 9 coupled to two shafts 10 coupled to the rotation spindle 3a of the swan-neck members 6.

The trunk lid 2 is pivoted in the direction of the arrow F in FIG. 1 by an actuator that is not shown in the drawings.

In the version shown in FIGS. 5 to 7 the trunk lid 11 is articulated at 12 to the front of the trunk 5 so that it can open from the rear toward the front, in the direction of the arrow $F_1$.

In this version, the rear part of the foldable roof 13 includes a wall 14 that closes the space between the front edge 11a of the trunk lid 11 and the wall 4 that closes the front of the trunk 5.

When the roof 13 is in the closed position on the vehicle, the rear shelf 3 articulated at 3a to the front edge 11a of the trunk lid 11 is folded under the latter, as shown in FIG. 5.

In this position the rear of the trunk lid 11 is locked to the rear part 8 of the trunk 5.

In the above version, means are provided for successively:

opening the trunk lid 11, the rear shelf 3 being folded under the trunk lid 11 by rotating it from the rear toward the front, folding the roof 13 and stowing the folded roof in the trunk 5, and folding the rear shelf 3 toward the front to close the space between the front edge 11a of the trunk lid and the wall 4 closing the front of the trunk 5, as shown in FIG. 7.

The rear shelf 3 can be pivoted by an electric motor coupled to the spindle 3a.

The trunk lid 11 can be pivoted about the articulation 12 by an actuator.

Of course, the invention is not limited to the embodiment just described to which many modifications can be made without departing from the scope of the invention.

There is claimed:

1. A truck for a convertible vehicle with a folding roof comprising a trunk lid which can open on the one hand for stowing the folded roof and on the other hand for stowing luggage, a rear shelf extending under the rear part of said roof in the closed position on said vehicle, foldable to allow the folded roof to pass, articulated to the front edge of said trunk lid and mobile between a position in which it extends between said front edge of said trunk lid and a wall that closes the front of said trunk and a folded position in which it extends under said trunk lid.

2. The trunk claimed in claim 1 wherein said rear shelf is articulated to said front edge of said trunk lid by at least one swan-neck member.

3. The trunk claimed in claim 1 wherein said trunk lid is articulated to the rear part of said trunk so that it can open from the front toward the rear.

4. The trunk claimed in claim 3 including means for successively:

pivoting said rear shelf to fold it under said trunk lid, opening said trunk lid by rotating it from the front toward the rear, folding the roof and stowing the folded roof in said trunk, and folding said rear shelf toward the front to close the space between said front edge of said trunk lid and said wall that closes the front of said trunk, closing said trunk lid.

5. The trunk claimed in claim 1 wherein said trunk lid is articulated to the front of said trunk so that it can open from the rear toward the front.

6. The trunk claimed in claim 5 wherein the rear part of said folding roof includes a wall that closes the space between said front edge of said trunk lid and said wall that closes the front of said trunk.

7. The trunk claimed in claim 5 including means for successively:

opening said trunk lid, said rear shelf being folded under said trunk lid, by rotating said trunk lid from the front toward the rear, folding the roof and stowing the folded roof in said trunk, and folding said rear shelf toward the front to close the space between said front edge of said trunk lid and the wall closing the front edge of said trunk.

* * * * *